March 18, 1952  D. W. BRIGHTWELL  2,589,530
PROJECTOR WITH ROTATABLE PICTURE
DRUM AND MAGNETIC BRAKING MEANS
Filed Nov. 14, 1950
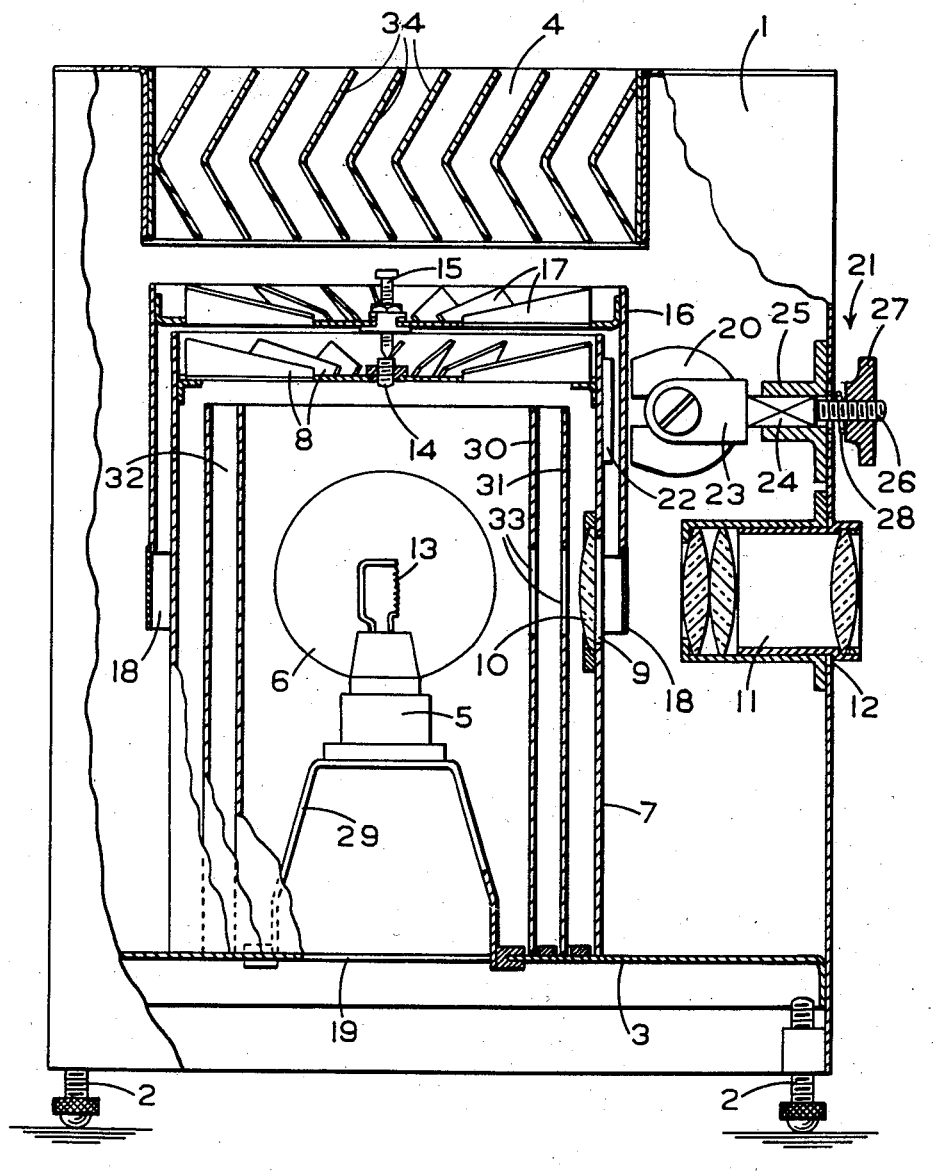
Inventor:-
Doreen Winifred Brightwell.
per:- Babcock & Babcock
Attorneys.

Patented Mar. 18, 1952

2,589,530

UNITED STATES PATENT OFFICE 2,589,530

PROJECTOR WITH ROTATABLE PICTURE DRUM AND MAGNETIC BRAKING MEANS

Doreen Winifred Brightwell, Rugby, England, assignor to Reginald Ernest Cooper, Mountsorrel, England Application November 14, 1950, Serial No. 195,579
In Great Britain January 12, 1950

1 Claim. (Cl. 88—27)

This invention relates to apparatus for projecting or viewing films and like transparencies particularly for advertising purposes and has for its object to provide a projector or viewing apparatus of simple and inexpensive construction having improved means whereby the films or like transparencies are automatically moved so that a continually changing and repeating sequence of pictures, views or the like may be projected onto a screen or the like, or may be viewed.

A further object of the present invention is to provide means whereby the speed of movement of the films or transparencies is controlled.

In order that the invention may be clearly understood and readily carried into practical effect, reference is made in the following description to the accompanying drawing which is an elevation mainly in section of a projector according to this invention.

Referring to the drawing an outer casing 1 is provided mounted on adjustable feet 2 and having a raised base 3 to enable air to enter the projector at the bottom thereof whilst an air outlet opening 4 is provided at the top of the casing 1.

The outer casing 1 carries within same a socket 5 for an electric lamp 6, preferably arranged as shown in an upright position, whilst surrounding said socket 5 and lamp 6 carried thereby is an inner lamp housing 7 having a top provided with a series of fixed radial vanes 8. The lamp housing 7 has a side aperture 9 closed by a condenser lens 10, and a projection lens system 11 is mounted in a side aperture 12 in the outer casing 1 in alignment with the said condenser lens 10 and filament 13 of the lamp 6, whilst a clearance is left between the housing 7 and outer casing 1 and also a space is left between the vanes 8 at the top of the housing 7 and the opening 4 in the top of the outer casing 1.

Co-axial with the vanes 8 and also at the top of the housing 7 is provided a central seating or bearing 14 of sapphire or the like to receive a needle bearing member 15 carried by a drum or carrier 16 so that the latter is balanced and rotatable about a vertical axis, which drum 16 also has radial vanes 17 disposed immediately over the fixed vanes 8 of the housing 7, whilst the sides of the drum 16 surround the upper part of the housing 7 in a depending manner.

The lower edge of the said rotatable drum 16 is adapted to carry strip film or the like transparencies 18 which may bear pictorial views and/or written matter, particularly advertising matter, said strip film 18 or the like being arranged to pass between the condenser lens 10 and the projection lens system 11 for projection onto a screen or the like suitable surface.

The arrangement is such that when the lamp 6 is switched on, that portion of the film or transparency 18 which is between the condenser lens 10 and projection lens system 11 is projected, and due to the convection currents of air created by the heat of the lamp 6, the drum 16 is caused to rotate owing to the convection currents of air acting upon the vanes 17 of the latter after deflection by the fixed vanes 8 of the housing 7. This rotation of the drum 16, which is thus automatic and continual so long as the lamp 6 remains lighted, causes the pictorial or other matter projected by the apparatus to be continually changing in a repeating sequence.

In order to control the speed of rotation of the drum 16 and prevent same rotating at too fast a rate, means are provided to retard the rotation of same, which means may comprise a permanent magnet 20 adjustably carried by screw means 21 on the inside of the outer casing 1 so as to be adjustable towards and away from the drum 16 which is then made of non-ferrous material such as aluminium, whilst on the outside of the housing 7 is a soft iron member 22 located opposite the magnet 20, so that the wall of the drum 16 passes between said soft iron member 22 and said magnet 20, the result produced being that the rotation of the drum 16 is damped by the eddy current braking effect of the magnet 20 and soft iron member 22.

As shown the magnet 20 may be of horse shoe form and the screw adjustment means 21 comprise a member having a forked part 23 and a shank 24 of square or other non-circular section slidable in a bush 25 mounted on the outer casing 1. The shank 24 is provided with a threaded extension 26 receiving a nut 27 whilst interposed between said nut and bush 25 is a compression spring 28. On manipulation of the knurled nut 27 the magnet 20 can be moved towards or away from the drum 16 to vary the intensity of the magnetic field across the path of rotation of said drum, the square section shank 24 preventing rotation of the fork 23 and magnet 20.

The lamp 6 is preferably, as shown, surrounded by two concentric tubular members 30, 31 forming a funnel to direct the convectional flow of air from the lamp to the vanes 8 and 17 whilst the annular air space 32 between the members 30, 31 provides insulation against lateral heat loss from the lamp 6. Both members 30, 31 are provided with apertures 33 in alignment with the lamp filament 13 and the condenser lens 10.

Communicating with the interior of the inner tubular member 30 is an air inlet opening 19 for the housing 7 in the base 3, the lamp socket 5 being mounted on an inverted U-shape support 29 astride the opening 19.

After passing the vanes 8 and 17 the convectional flow of air passes out through the opening 4 in the outer casing 1 which opening is as shown desirably provided with a plurality of angle section slats 34 permitting passage of the air but forming a light trap against rays of light from the lamp 6 creating any undesired illumination. The slats 34 are preferably removable en bloc from the opening 4 which latter is large enough to allow the drum 16 to be readily withdrawn for changing the film or transparencies 18 thereon or for the removal of the lamp 6.

An apparatus according to the present invention is particularly adapted for use in projecting advertising matter in the window or interior of a shop or like establishment, the matter either being projected onto a wall screen or onto a ground glass or like screen behind which the apparatus is disposed. Alternatively, the matter may be viewed direct through a viewing side aperture formed in the outer casing 1, the projection lens system 11 being then dispensed with.

In a novel use of apparatus according to the present invention an ultra violet lamp 6 may be employed for projecting the matter onto a fluorescent screen, the visible rays emitted by the lamp being screened from sight.

I claim:

A projector comprising an outer casing having an upper air outlet and an aperture in the side thereof; a base mounted within said outer casing; a lamp housing mounted on said base, said housing having an open upper end, an opening at its lower end and an aperture in the side thereof in alignment with the aperture in said outer casing; a support for a lamp within said lamp housing; a condenser lens mounted in the aperture of said lamp housing; a projection lens system mounted in the aperture of said outer casing; a rotatable drum disposed about said lamp housing, said drum being adapted to carry film or transparencies for movement between and in alignment with said condenser lens and projection lens system; bearing means rotatably supporting the drum from the upper end of said lamp housing; a plurality of radially disposed vanes fixed across the open upper end of said lamp housing; a plurality of radially disposed vanes mounted on said drum and positioned over the fixed vanes on said lamp housing for effecting automatic rotation of said drum by convectional air flow through the vanes created by burning a lamp within said lamp housing so that film or transparencies mounted on said drum are automatically passed between the condenser lens and projection lens system for projection; a magnetic member mounted on the outside of said lamp housing and adjacent said drum; a magnet supported from said outer casing; means for adjusting said magnet towards and away from the exterior of said drum and opposite said magnetic member for creating eddy currents to retard the speed of rotation of said drum.

DOREEN WINIFRED BRIGHTWELL.

REFERENCES CITED

The following references are of record in the file of this patent:

UNITED STATES PATENTS

| Number | Name | Date |
| --- | --- | --- |
| 1,077,690 | Evans | Nov. 4, 1913 |
| 1,386,126 | Lynes | Aug. 2, 1921 |
| 1,450,179 | Issacs et al. | Apr. 3, 1923 |
| 1,472,222 | Le Vie | Oct. 30, 1923 |
| 1,567,471 | Skeen | Dec. 29, 1925 |
| 1,610,055 | Hornbeck | Dec. 7, 1926 |
| 1,698,872 | Bernstein | Jan. 15, 1929 |
| 2,501,862 | Cloud | Mar. 28, 1950 |

FOREIGN PATENTS

| Number | Country | Date |
| --- | --- | --- |
| 501,540 | Great Britain | Feb. 28, 1939 |